United States Patent
Röös et al.

(10) Patent No.: US 6,601,535 B1
(45) Date of Patent: Aug. 5, 2003

(54) METHOD AND APPARATUS FOR DETECTING LINER SLIPS

(75) Inventors: Elin Röös, Årsta (SE); Maria Wäppling, Stockholm (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 10/070,225

(22) PCT Filed: Aug. 18, 2000

(86) PCT No.: PCT/SE00/01590
§ 371 (c)(1),
(2), (4) Date: Feb. 26, 2002

(87) PCT Pub. No.: WO01/17335
PCT Pub. Date: Mar. 15, 2001

(30) Foreign Application Priority Data
Sep. 3, 1999 (SE) ............................................. 9903016

(51) Int. Cl.[7] .............................................. A01J 5/007
(52) U.S. Cl. ................................. 119/14.02; 119/14.14
(58) Field of Search ........................... 119/14.02, 14.08, 119/14.14, 14.15, 14.17, 14.44, 14.49

(56) References Cited

U.S. PATENT DOCUMENTS 3,967,587 A * 7/1976 Noorlander ............... 119/14.49
5,284,180 A * 2/1994 Guo et al. .................... 137/488

FOREIGN PATENT DOCUMENTS

| WO | WO8907884 | 9/1989 | ............. A01J/7/00 |
| WO | WO9617509 | 6/1996 | ............. A01J/5/017 |

OTHER PUBLICATIONS

Article entitled "Measurement of Liner Slips, Milking Time, and Milk Yield" from the Journal of Dairy Science, vol. 79, No. 3, 1996.
Article entitled "Measuring Milking Machine Liner Slips" from the Journal of Dairy Science, vol. 73, No. 4, 1990.
Article entitled "Air Leakage Past The Teat and Teatcup Liner During Milking" from the Australian Journal of Dairy Technology, Mar., 1973.
Abstract page of Soviet Union Patent SU–986–360–A published Jan. 7, 1983.

* cited by examiner

Primary Examiner—Charles T. Jordan
Assistant Examiner—Kimberly S. Smith
(74) Attorney, Agent, or Firm—Hovey Williams LLP

(57) ABSTRACT

The present invention refers to a method and apparatus (1) for detecting liner slips in a milking machine which involves, for each milking unit, a clawpiece and a cluster of teat cups connected to the clawpiece, wherein each teat cup has a rigid shell body and an internal flexible liner, the liner comprising a mouthpiece and a body part, whereby the liner extends through the bottom of the shell body as a short milk tube and is connected to the clawpiece and further, by way of a long milk tube, to a source of steady vacuum, while the annular space, between the teat cup shell body and the teat cup liner, is connected to the clawpiece by a pulse tube and further to a source of pulsating vacuum. Alternatively, each liner in the system is connected to the vacuum source by way of a respective individual long milk tube, wherein the clawpiece is omitted. The invention includes continuously or discontinuously sensing the pressure in the system downstream of said long milk tube(s), and detecting a liner slip in dependence of a predetermined change in said sensed pressure.

34 Claims, 2 Drawing Sheets

METHOD AND APPARATUS FOR DETECTING LINER SLIPS

TECHNICAL FIELD OF THE INVENTION

The present invention generally relates to dairy farm machine milking and particularly to a method and an apparatus for detecting liner slips during machine milking, i.e. when the liner slips on the teat of an animal due to air leaking past the teat and the liner.

DESCRIPTION OF RELATED ART AND BACKGROUND OF THE INVENTION

In modern dairy farm industry there are continuous research and development activities in order to improve the efficiency of milking machines, which, inter alia, involves increased milk yield, reduced milking time, while still maintaining good udder health.

One of the parameters in this respect is the presence of liner slips. These slips, that occasionally appear, may affect, i.e. increase the occurrence of udder infections, which results in a deteriorated milk quality. Besides, many liner slips produce an irritating noise, and if the slip is large the milking equipment may even fall off the animal. Thus, milking equipment should be designed to introduce as few liner slips as possible, and preferably no liner slips at all. Therefore, the number of liner slips is monitored during development and testing of different equipment.

Manual counting of liner slips by virtue of listening for the noise that they cause have been performed at test farms, but such a method is time consuming, labor intensive, costly, and to a certain degree unreliable as one has to rely on the human perception.

Attempts have been made to solve the problem of the lack of a reliable liner slip measuring system using some different approaches.

Measuring increased air flow through the system as a measure of the degree of liner slip is disclosed by G. A. Mein et al. in Air leakage past the teat and teatcup liner during milking, Aus. J. Dairy Tech., March 1973 and by E. J. O'Callaghan in *Measurement of liner slips, milking time and milk yield*, J. Dairy Sci. 79:390, 1995. A liner slip was defined by O'Callaghan as an air inlet larger than 35 l/min. Drawbacks associated with this method includes, inter alia, time-demanding re-calibration during the measurement and the requirement of voluminous equipment.

Measuring the vacuum drop in the claw was proposed by S. B. Spencer and C. Volz in *Measuring milking machine liner slips*, J. Dairy Sci. 73:1000, 1989. They suggested a vacuum drop of 8 kPa in less than 0.25 seconds as a criterion for a liner slip. Subsequent to a detected liner slip, the detector was blocked during five seconds in order not to detect subsequent fluctuations, that might occur, as a further liner slip. This approach may, however, not always provide adequate protection from mechanical damage of the measuring equipment; for instance external electric connection cables to the claw will be needed, which further infers that it may not operate satisfactorily in the long run. The approach also puts restrictions on the size of the sensor to be employed.

SUMMARY OF THE INVENTION

Accordingly, it is an object of the present invention to provide a method for detecting liner slips in a milking machine which involves, for each milking unit, a clawpiece and a cluster of teat cups connected to the clawpiece, wherein each teat cup has a shell body and an internal flexible liner, said liner comprising a mouthpiece and a body part, whereby the liner extends through the bottom of the shell body as a short milk tube and is connected to the clawpiece and further, by way of a long milk tube, to a source of steady vacuum, while the annular space, between the teat cup shell body and the teat cup liner, is connected to the clawpiece by a pulse tube and further to a source of pulsating vacuum, which avoids at least some of the problems discussed above.

It is in this respect a particular object of the invention to provide such a method that is effective, accurate, reliable, easy to install and maintain, and particularly of a low cost.

It is yet a further object of the invention to provide the method in such a way that it is easily reconfigurable to meet changing demands.

These objects among others are, according to one aspect of the invention, fulfilled by a method wherein a milking machine system is provided, the milking machine system having at least one milking unit. Each of the milking units include a clawpiece and a cluster of teat cups connected to the clawpiece, each of the teat cups having a shell body and an internal flexible liner. The liner includes a mouthpiece and a body part whereby the liner extends through the bottom of the shell body as a short milk tube and is connected to a source of steady vacuum by way of a long milk tube. An annular space is located between the teat cup shell body and the teat cup liner, the annular space being connected to the clawpiece by a pulse tube and further to a source of pulsating vacuum. The method includes the steps of sensing the pressure in the system downstream of the long milk tube and the step of detecting a liner slip in dependence of a predetermined change in the sensed pressure.

A further object of the present invention is to provide an apparatus for performing the method according to the first aspect of the invention.

In this respect, it is yet a further object of the invention to be integratable in existing machine milking systems.

Consequently, there is according to a second aspect of the present invention provided an apparatus for use in a milking machine having at least one milking unit. Each of the milking units include a clawpiece and a cluster of teat cups connected to the clawpiece, each of the teat cups having a shell body and an internal flexible liner. The liner includes a mouthpiece and a body part whereby the liner extends through the bottom of the shell body as a short milk tube and is connected to a source of steady vacuum by way of a long milk tube. An annular space is located between the teat cup shell body and the teat cup liner, the annular space being connected to the clawpiece by a pulse tube and further to a source of pulsating vacuum. The apparatus includes a pressure sensor located downstream of the long milk tube for continuously or discontinuously sensing the pressure in the system downstream of the long milk tube and a detector connected to the sensor arranged for detecting a liner slip in dependence of a predetermined changed in the sensed pressure.

Yet a further object of the present invention is to provide a method for detecting liner slips in a milking machine system which involves, for each milking unit, teat cups, each having a shell body and an internal flexible liner, said internal flexible liner comprising a mouthpiece and a body part, wherein each liner extends through the bottom of the respective shell body and is connected, by way of a respective long milk tube, to a source of steady vacuum, while the respective annular space, between the shell body and the liner, is connected to a source of pulsating vacuum, which exhibits the above said characteristics.

Accordingly, there is according to a third aspect of the present invention provided a method for detecting liner slips in a milking machine system having at least one milking unit, each of the milking units including a plurality of teat cups and each of the teat cups having a shell body and an internal flexible liner. The internal flexible liner includes a mouthpiece and a body part, wherein each liner extends through the bottom of the respective shell body and is connected, by way of a respective long milk tube, to a source of steady vacuum. A respective annular space, located between the shell body and the liner is connected to a source of pulsating vacuum. The method of this third aspect includes the steps of sensing the pressure in the system downstream of the long milk tubes, and detecting a liner slip in dependence of a predetermined change in the sensed pressure.

Finally, an object of the invention is to provide an apparatus for performing the method according to the third aspect of the invention and hence, an apparatus is provided for detecting liner slips in a milking machine system having at least one milking unit. Each milking unit has a plurality of teat cups, each having a shell body and an internal flexible liner, the internal flexible liner including a mouthpiece and a body part. Each liner extends through the bottom of the respective shell body and is connected, by way of a respective long milk tube, to a source of steady vacuum. An annular space is located between the teat cup shell body and the teat cup liner and is connected to a source of pulsating vacuum. The apparatus includes a pressure sensor located downstream of the long milk tubes for continuously or discontinuously sensing the pressure in the system downstream of the long milk tubes, and a detecting means connected to said sensor arranged for detecting a liner slip in dependence of a predetermined change in the sensed pressure.

An advantage of the present invention is that while its sensor is implemented downstream of the long milk tube(s), it is protected from mechanical stress and no electric connections or the like is necessitated upstream of this point, which provides a reliable operation of the same.

Further characteristics of the invention and advantages thereof will be evident from the following detailed description of embodiments of the invention, which are shown in the accompanying drawings.

BRIEF DESCRIPTION OF THE DRAWINGS

The present invention will become more fully understood from the detailed description of embodiments of the present invention given hereinbelow and the accompanying FIGS. 1–4 which are given by way of illustration only, and thus are not limitative of the invention.

DETAILED DESCRIPTION OF EMBODIMENTS

Figure 1:
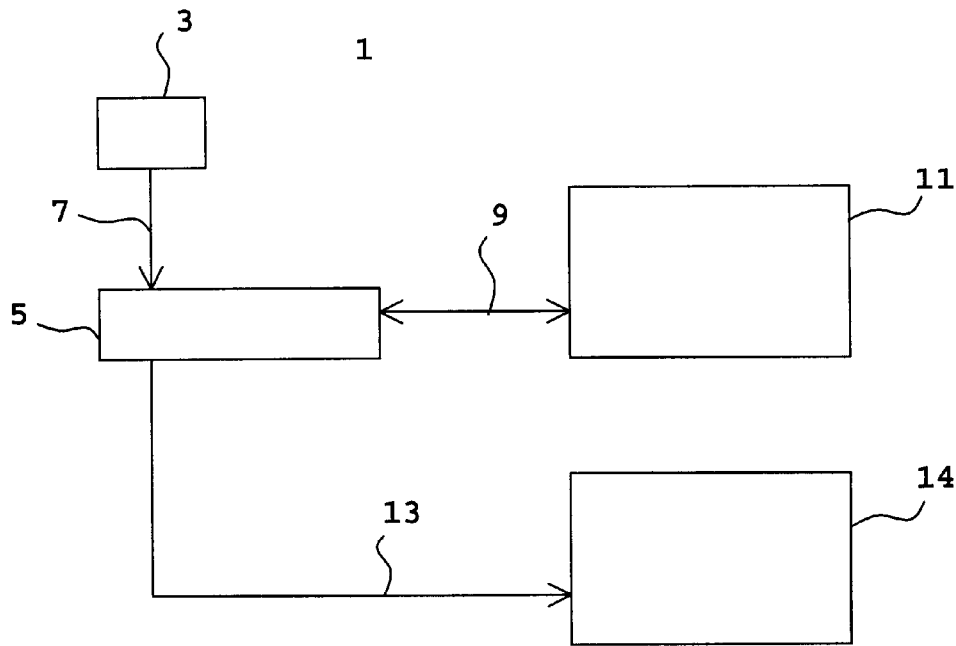
FIG. 1 displays schematically an apparatus for detecting liner slips according to an embodiment of the present invention.

In the following description, for purposes of explanation and not limitation, specific details are set fourth, such as particular hardware, applications, techniques, etc. in order to provide a thorough understanding of the present invention. However, it will be apparent to one skilled in the art that the present invention may be practiced in other embodiments that depart from these specific details. In other instances, detailed descriptions of well-known methods, protocols, apparatuses, and circuits are omitted so as not to obscure the description of the present invention with unnecessary details.

The present invention is to be employed for detection of liner slips in a milking machine, which typically involves for each animal milking unit, a clawpiece and a cluster of four teat cups connected to the clawpiece. Each teat cup has a rigid shell and an internal flexible liner. This liner has a topmost mouthpiece and a body part inside the shell body. The liner extends through the bottom of the shell body as a short milk tube. This tube is connected to clawpiece and thence, by way of a long milk tube, to a source of steady vacuum. An annular space, between the teat cup shell and the teat cup liner, is connected to the clawpiece by a pulse tube and thence to a source of pulsating vacuum. A milk meter may be attached to the downstream end of the long milk tube.

For milking, the four teat cups are placed around the animal's teats, the liner mouthpiece of each teat cup being fitted over the respective teat. The teat cups are held in position during the milking by adhesion, due to the steady vacuum applied for the milking. The pulsating vacuum applied between the teat cup liner and shell causes the liner body to dilate and contract again, thus promoting the flow of milk by simulating suckling. After completion of the milking, the teat cup cluster is removed from the animal's teats, either manually or by automatic means.

During milking the liners may slip on the respective teat of the animal due to air leaking past the teat and the liner. This unwanted phenomenon, named liner slip, may lead to udder infections, se e.g. J. O'Shea, *Machine milking and mastitis*, Bulletin of the international dairy federation, 215, Sec 2, 1987. Furthermore, if the liner slip is large, the teat cup may slip off the teat, which may cause the entire cluster to fall off. Liner slips usually occur during the final part of the milking as the teat empties and the liner crawls up the teat.

Liner slips increases the airflow in the milking system, which causes a vacuum drop. The airflow gets mixed with the milk, which may result in a turbulent milk flow whereby larger fat particles split into smaller particles, which in turn might lead to shorter durability of fresh milk. More important, however, is that the turbulent air and milk droplet mixture may be propelled towards the teat ends and partially or totally penetrate the teat canal. Hence, pathogens and other particles may be introduced into healthy teats and cause irritation and udder infection, so called mastitis.

The vacuum drop in the liner may cause a rapid flow, called cross flow, of milk from the slipping liner into another liner, or a flow, called jet flow, of mixed air and milk from the claw towards the teat tip. These flows may further impact the teats in an unwanted manner.

A liner slip may be defined as a slip due to a rather large and rapid air inlet, and should preferably not include small air inlets that more or less continuously leaks past the teats (approximately 0.2 l/min) as these latter air inlets are less critical for the teat health. The present invention allows for user defined liner slips which may be altered, as will be discussed further below.

It is possible to measure the liner slip as a vacuum drop in the system since this is a direct consequence of the increased airflow which a liner slip causes. However, the vacuum in the milking system is never constant; it varies due to different factors. The vacuum fluctuations may be divided into acyclic and cyclic fluctuations, of which the former are mostly created by air admission into the system, transport of milk and underdimensioned milking installations, and the latter are caused by volume changes beneath the teat tip as a consequence of the liner's opening and closing. The size of the fluctuations depends on the milk flow.

The present invention comprises an apparatus for detecting liner slips, said apparatus comprises a pressure sensor located downstream of said long milk tube for continuously or discontinuously sensing the pressure in the system downstream of said long milk tube, and a detecting means connected to said sensor arranged for detecting a liner slip in dependence of a predetermined change in said sensed pressure.

FIG. 1 displays schematically an embodiment of such an apparatus for detecting liner slips. The apparatus 1 comprises a pressure sensor or transducer 3 located at the downstream end of the long milk tube (not shown). The pressure sensor 3 may be an absolute pressure sensor, but is preferably a differential pressure sensor, that measures the difference between the pressure inside the long milk tube in the vicinity of its downstream end and the pressure outside said milk tube. The sensor may further be a capacitive, deflection or magnetic sensor, but is preferably a piezoresistive transmitter enclosed n a corrugated flush diaphragm of steel filled with a non-compressible medium such as silicon oil.

The sensor 3 is preferably mounted by use of a T-piece of e.g. stainless steel (not shown). Said T-piece is mounted with its first end connected to the downstream end of the long milk tube and its second end connected to the steady vacuum, e.g. via a milk meter and further tubing. The pressure sensor 3 is attached at the third end of the T-piece by virtue of an attaching means such as a nut.

The sensor 3 is connected to detecting means 5 via electric connection 7 and arranged to transfer an electric output signal, for instance a voltage signal 0–5 V or a current signal 4–20 mA, preferably substantialy proportional to the sensed pressure, to detecting means 5. Said detecting means 5 typically comprises a micro-controller with appropriate software for detecting liner slips and for communication. The micro-controller is, in the illustrated embodiment, via connection 9 further connected to an input/output means such as a PC 11 for, e.g. setting of parameters, and via connection 13 to a main controller 14 of the machine milking system for transferring of the number of detected liner slips during the milking. In an alternative embodiment, the input/output means 11 and/or the detecting means 5 may constitute integral part(s) of the main machine milking controller system 13. The arrows of communication lines 7, 9, 13 indicate the data transmittal direction.

Figure 2:
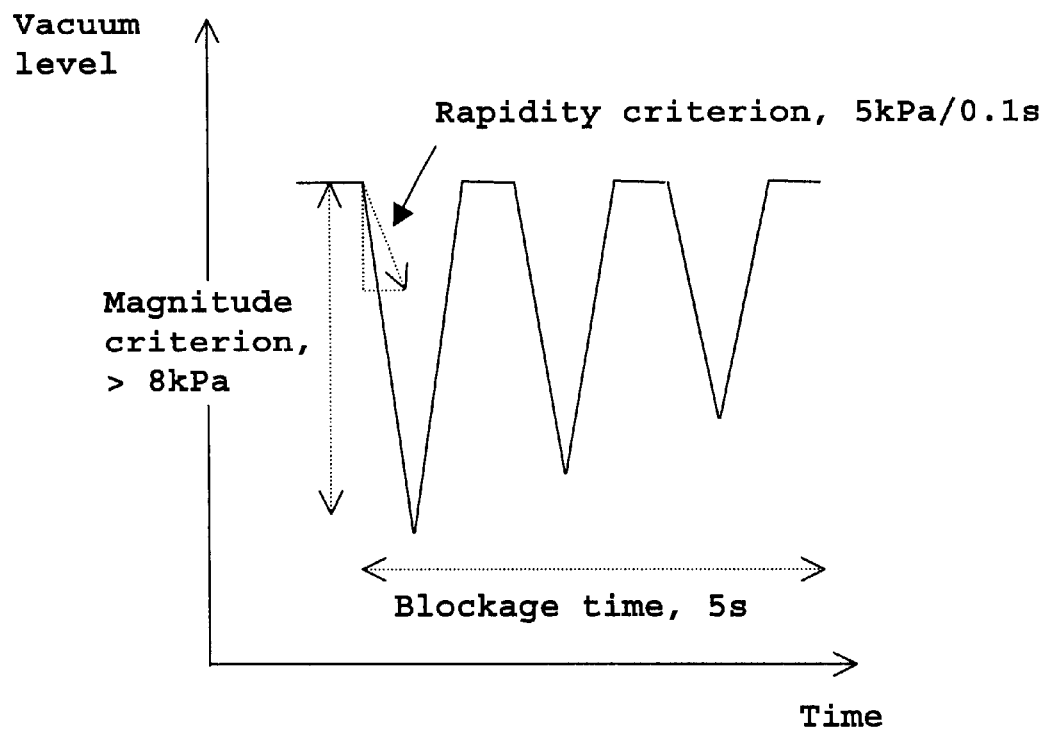
FIG. 2 illustrates diagrammatically the vacuum level as a function of time during a typical liner slip wherein various detection criteria as used in the present invention are indicated.

Considering next FIG. 2, which illustrates the vacuum level as a function of time during a typical liner slip, the various inventive detection criteria the liner slip detecting software in the detecting means may employ, are diagrammatically indicated. The vacuum level exhibits three fast subsequent vacuum drops, of which, however, the two latter follow the initial liner slip due to the pulsating action in the system. The latter vacuum drops are known as liner squawk and should not be interpreted as liner slips.

The detecting criteria comprise the following ones, of which all may preferably be employed simultaneously. However, the present invention is intended to cover any single criterion as well as any combination of criteria.

A rapidity criterion. A liner slip is detected if a vacuum drop occurs, which has a pressure derivative equal to or larger than a predetermined level. This criterion may separate fast liner slips from slow cyclic and acyclic pressure variations. The rapidity criterion may preferably be implemented as a predetermined pressure rise, e.g. 5–15 kPa, during a short period of time, e.g. 0.1–0.2 seconds.

A magnitude criterion. A liner slip is detected if a vacuum drop occurs that has a magnitude equal to or larger than a predetermined level. This criterion may separate large air inlets that occur at liner slips from smaller amounts of air that more or less continuously leak past the teat. The magnitude criterion may preferably be implemented as a predetermined pressure rise, e.g. 5–15 kPa. For practical reasons, the magnitude criterion may comprises that said predetermined pressure rise has to occur during a predetermined period of time, preferably 0.5–1 seconds, which is considerably longer than the period of time associated with the rapidity criterion. The time should be set long enough to detect the entire pressure peak.

A time blocking criterion. Subsequent to a detected liner slip the detecting is blocked during a predetermined blocking time, e.g. 5 seconds, in order to separate liner slips from liner squawk. This blockage time implies that two detected liner slips always are separated in time with at least this time.

A blocking at high-pressure criterion. If sensed pressure is above a predetermined level the detecting is blocked. This criterion ensures that detecting does not occur when no milking is performed, i.e. no vacuum is supplied.

A blocking during cluster attachment criterion. The detecting is further blocked during a predetermined period of time for cluster attachment. This blocking time may be triggered by a vacuum supply sensed by the sensor and last for a number of seconds, e.g. 10 seconds. This criterion separates the liner slips from fast and heavy vacuum fluctuations during cluster attachment before milking is to proceed.

The number of detected liner slips during a predetermined period of time, particularly one corresponding to one milking, is accumulated, preferably in the detecting means 5, whereafter this number is sent to the main controller 14 for storing together with other data regarding the milking. The criteria are set (and may be adjusted) through two-way communication between the detecting means 5 and the input/output means 11. The various criteria are further discussed below in this specification in relation to the reporting of various experiments performed both in the laboratory and in the field.

Results from experiments as regards the location in the machine milking system of the sensor of the inventive detection apparatus as compared with other locations will be discussed next.

It was found experimentally that a liner slip was always visible as a drastic drop of the vacuum level in the claw.

Hence, experiments were performed in order to investigate how far downstream in the milking machine system a vacuum drop due to liner slip may be detected as it is preferable to locate the sensor as far downstream as possible.

Experiments were performed in a 14 stall Herringbone parlour using alternating pulsation with a pulsation rate of 60 pulsations per minute. The pressure was measured simultaneously at three different points in the system; in the claw, at the end of a standard long milk tube, just before inlet to a milk meter and in the upper part of the milk meter right behind the inlet. Three miniature transducers with semiconductor sensors (model P10EZ from Viggo-Spectramed) were used. At the end of the long milk tube the sensor was connected to a syringe that was inserted through the rubber material. The sensor signals were recorded and saved using a PC with appropriate designed software.

Figure 3:
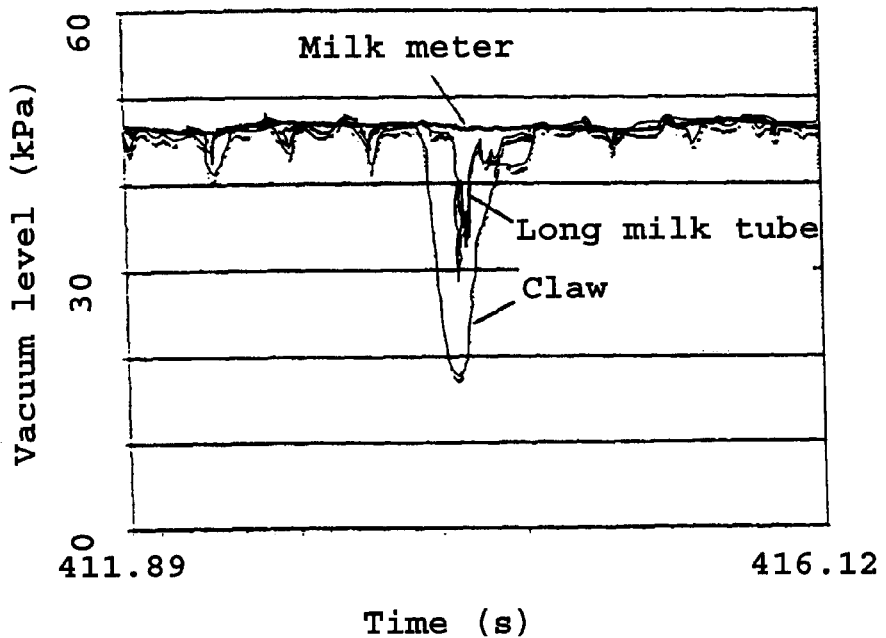
FIG. 3 illustrates diagrammatically vacuum levels as measured during an induced liner slip at various points in a milking machine in which the present invention may be employed.

During the milking of three different cows, several liner slips were induced by pressing at the teat Just above the mouthpiece. During a fourth milking a true liner slip occurred. The pressure recordings from the four milkings were studied in detail and the number of liner slips distinguishable from the normal vacuum variations at the end of the long milk tube and in the milk meter were compared with the number of liner slips distinguishable in the claw. Examples of the three different vacuum levels are diagrammatically shown in FIG. 3.

The vacuum drops due to liner slips were analyzed and the results are presented in Table 1. Each liner slip that was distinguishable in the claw was also visible as a drop in the vacuum level at the end of the long milk tube. This was not always the case in the milk meter, where only 45–75% of the induced liner slips seen in the claw was distinguishable.

According to the results, it is seen that a reliable liner slip detecting apparatus may have its sensor located at the end of the long milk tube. There are many advantages in locating a sensor at this position instead of in the claw; a larger sensor can be used, the sensor will be better protected against mechanical damage and no wires to the claw will be needed. Locating the sensor in the milk meter would provide the same advantages; however, this is not a good alternative in the present configuration since some of the liner slips will not be detected. In other circumstances, however, the sensor may equally well be located in the milk meter or even further downstream.

TABLE 1

Number of induced liner slips as distinguished in the claw, at the end of the long milk tube, and in the milk meter, respectively. The percentages of the number of distinguished liner slips at the two latter points as compared with the number of distinguished liner slips in the claw are shown within parenthesis.

| Cow | No. of distinguishable liner slips in the claw | No. of distinguishable liner slips at the end of the long milk tube | No. of distinguishable liner slips in the milk meter |
| --- | --- | --- | --- |
| 1 | 14 | 14 (100%) | 9 (64%) |
| 2 | 16 | 16 (100%) | 12 (75%) |
| 3 | 29 | 29 (100%) | 13 (45%) |

In the experiment performed the normal vacuum variations in the claw were cyclic with a period of approximately 0.5 seconds. The magnitude of the fluctuations in the claw depends on the milk flow; a large milk flow gives rise to large vacuum variations, sometimes as large as 10 kPa. At the end of the long milk tube the variations were smaller and less regular. The magnitude of the variations was usually less than 5 kPa, but occasionally large drops with a magnitude of up to 8 kPa could be noted. These large vacuum fluctuations could have a fall time of less than 0.2 seconds.

Results from experiments as regards the effects of the settings of the inventive rapidity and magnitude criteria on the performance of the detection apparatus according to the invention will be considered next.

In the setup as used the vacuum level at the end of the long milk tube varied during a milking as follows.

Before milking started, vacuum was applied to the system, but the entrance to the long milk tube was at this time blocked by a rubber seal. Hence, the cluster and the long milk tube were kept at atmospheric pressure. Just before the cluster was attached the user opened the rubber seal (e.g. by pressing a button), whereby vacuum was applied to the long milk tube and the cluster. If two different vacuum levels were employed (one low, e.g. 33 kPa, in the beginning and at the end of the milking and one higher, e.g. 50 kPa, in the middle part of the milking), the lower one was applied.

When the cluster was attached to the udder, the vacuum level dropped drastically several times due to large amounts of air that entered the system. When the cluster was properly attached, the vacuum level stabilized and stayed at the lower level within normal cyclic variations.

The higher vacuum level was then applied, i.e. when the milk flow reached a certain limit, e.g. 100–500 g/min. If no liner slips or fall-offs occurred, the vacuum level stayed stable within the normal variations until the milk flow decreased below the above mentioned limit. A this point, the vacuum level was reduced to the lower vacuum level. A certain time after the vacuum transition from high to low vacuum, the rubber seal disconnected the long milk tube from the vacuum supply, the cluster was automatically detached and the vacuum level in the cluster and the long milk tube dropped to atmospheric pressure.

In order to prevent the milk, remaining in the cluster after removal, from leaking out on the floor, vacuum (e.g. the higher level) was applied again during a few seconds and the milk was sucked out. However, sometimes there was a valve in the claw used to close the outlet to the long milk tube in case of fall-off. This prevented dirt from being sucked into the milk tank. If this valve was used it also prevented the milk from being sucked out after take-off. It acted as a seal between the long milk tube and the claw, so that between milkings the vacuum remained in the long milk tube, whereas there was atmospheric pressure in the claw. If the valve was locked in open position, the vacuum level in the long milk tube also fell to atmospheric pressure after a few seconds of vacuum.

In order to evaluate rapidity and magnitude criteria, experiments were performed with various different settings, the results of which are shown in Table 2. For most values of the rapidity and magnitude criteria the liner slip detecting apparatus worked excellently. When low parameter values (5–6 kPa) were used, many normal vacuum variations were detected as false positives, i.e. they were incorrectly detected as liner slips. This was not surprising, since it had been seen before that normal vacuum variations in the laboratory setup were very large. As expected, too large parameter values did not allow detection of all air inlets.

In order to test the blockage of further detection after the occurrence of a liner slip, the blockage time parameter was altered, and it was ascertained that after the detection of a liner slip, further detection was blocked during the time chosen.

TABLE 2

Laboratory test results of the inventive liner slip detection apparatus.
The number of liner slips as correctly and incorrectly detected, respectively,
for different settings of the detection criteria rapidity and magnitude are shown.
The percentages of the number of correctly detected liner slips as compared with
the number of induced liner slips are shown within parenthesis.

| Values of criteria | | High flow, vacuum level 50 kPa | | | Low flow, vacuum level 33 kPa | | |
| --- | --- | --- | --- | --- | --- | --- | --- |
| Rapidity (kPa/0.2 s) | Magnitude (kPa) | No. of air inlets | No. detected | No. false positives | No. of air inlets | No. detected | No. false positives |
| 5  | 5  | 20 | 20 (100%) | 23 | 20 | 20 (100%) | 21 |
| 5  | 8  | 20 | 20 (100%) | 0  | 20 | 20 (100%) | 0  |
| 6  | 6  | 20 | 20 (100%) | 5  | 20 | 20 (100%) | 3  |
| 6  | 8  | 20 | 20 (100%) | 0  | 20 | 20 (100%) | 0  |
| 8  | 10 | 20 | 20 (100%) | 0  | 20 | 20 (100%) | 0  |
| 8  | 15 | 20 | 10 (50%)  | 0  | 20 | 20 (100%) | 0  |
| 8  | 20 | 20 | 3 (15%)   | 0  | 20 | 20 (100%) | 0  |
| 10 | 10 | 20 | 20 (100%) | 0  | 20 | 20 (100%) | 0  |
| 10 | 12 | 20 | 17 (85%)  | 0  | 20 | 18 (90%)  | 0  |

The liner slip detecting apparatus was also tested during four milkings in a Herringbone parlour. Several combinations of the rapidity and magnitude criteria were tested.

The normal vacuum variations were much smaller than in the laboratory. Parameter values equal to or greater than 5 kPa in 0.2 seconds and 5 kPa, respectively, were used without detecting any false positives, but if they were further lowered, several normal vacuum variations were detected as liner slips. However for the indicated parameter values, the transition from high to low vacuum was occasionally detected as a liner slip. Hence, these transitions may be faster than 5 kPa in 0.2 seconds. The value of the rapidity criteria must be increased to 6 kPa in 0.2 seconds in order to avoid vacuum transitions from being detected as liner slips.

The value of the magnitude criterion should be higher than the vacuum value of the rapidity criterion. Therefore, it is not ideal to use a rapidity criterion of 6 kPa or higher in 0.2 seconds since this would restrict the user's possibilities to detect small liner slips. Consequently, the rapidity criterion should be modified by decreasing the time, e.g. to 0.1 seconds, instead of increasing the pressure value.

Using criteria of 5 kPa in 0.1 seconds and 5–8 kPa, respectively, was found to be optimal values. When a rapidity criterion of 5 kPa in 0.1 seconds is used, the risk of detecting vacuum transitions as liner slips is very small. A magnitude criterion value of 7–8 kPa prevents normal vacuum variations from being detected as liner slips. Very small air inlets could be missed by using these parameter values, but it all comes down to the subtle question of how to define a liner slip. The risk of detecting normal vacuum variations as liner slips is increased as the magnitude criterion value is decreased.

The above stated numerical values are off course equipment dependent and shall therefore only be taken as illustrative examples.

If the user wants to make sure that no normal vacuum variations are detected, the magnitude criterion value should be increased further, and if he wants to perform very accurate measurements of small liner slips, the magnitude of the normal vacuum variations at the end of the long milk tube (or elsewhere where the sensor is located) should be determined before and used when setting the criteria values.

Figure 4:
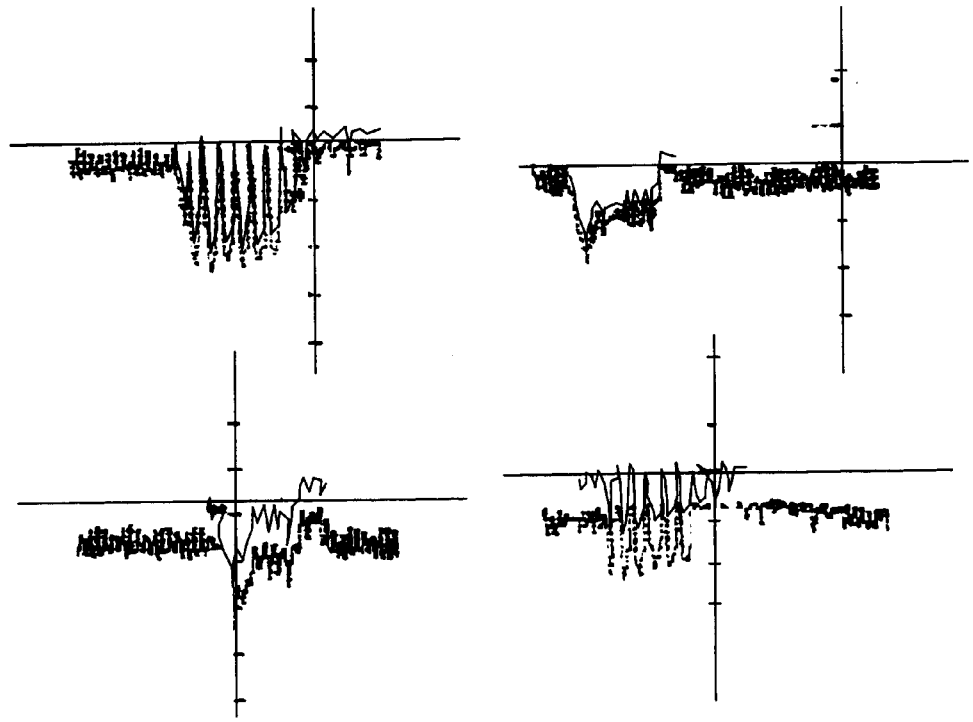
FIG. 4 displays four strip chart recordings of the vacuum level in the claw of the milking machine during occurrence of liner slips, all of which were detected as liner slips by the liner slip detecting apparatus according to the present invention.

Finally, FIG. 4 displays four examples of strip chart recordings of the vacuum level in the claw of the milking machine during occurrence of liner slips, all of which were detected as liner slips by the inventive liner slip detecting apparatus.

A further embodiment of the present invention (not illustrated) comprises the implementation of the liner slip detecting apparatus in a milking machine system that slightly deviates from the system described above. Here, the milking machine system comprises, for each milking unit, teat cups, each having a shell body and an internal flexible liner, said internal flexible liner comprising a mouthpiece and a body part, wherein each liner extends through the bottom of the respective shell body and is connected, by way of a respective long milk tube, to a source of steady vacuum, while the respective annular space, between the shell body and the liner, is connected to a source of pulsating vacuum. Each long milk tube may be connected to a respective shut off and regulator valve and then, by way of a further tube, to a respective milk meter for measuring the milk yield from each teat individually. The output from each milk meter is preferably connected to a further milk meter for measuring the weight of the milk, thus giving the total milk yield for all teats. Said milk meter is preferably mounted in immediate connection to the milk receiver.

The liner slip detecting apparatus comprises a pressure sensor located downstream of said long milk tubes (e.g. before said valves, in between the valves and the individual milk meters, or after said milk meters) for continuously or discontinuously sensing the pressure in the system downstream of said long milk tubes, and a detecting means connected to said sensor arranged for detecting a liner slip in dependence of a predetermined change in said sensed pressure.

Preferably, a pressure sensor is located at the end or further downstream of each long milk tube for sensing the individual pressure at the end of each long milk tube, wherein the detecting means is arranged for detecting a liner slip in dependence of a predetermined change in one of each sensed pressures and for identifying the slipping liner, by way of identifying said one of each sensed pressures.

The detecting apparatus may otherwise be implemented as described elsewhere in this detailed description of embodiments e.g., with the detecting means arranged for detecting a liner slip if said predetermined pressure change fulfills a rapidity criterion, and/or a magnitude criterion.

In summary, a reliable and high-quality method and apparatus is disclosed for detecting and counting of liner slips that occur during milking using various different milking machines.

The apparatus comprises a pressure sensor located downstream of the long milk tube(s) for continuously or discontinuously sensing the pressure in the system downstream of said long milk tube(s), and a detecting means connected to said sensor arranged for detecting liner slips in dependence of predetermined changes in said sensed pressure.

The invention offers, inter alia, the following features and advantages.

- The apparatus is suited for the extreme environment that a milking machine may comprise. The most exposed part of the apparatus is the vacuum sensor preferably located at the end of the long milk tube(s), which will be in contact with milk, hot water and washing detergents.
- There are many advantages in locating a sensor at this position instead of further upstream such as in the claw; a larger sensor can be used, the sensor will be better protected against mechanical damage and no wires to the claw will be needed. This will particularly allow for long-term operation of the liner slip detecting apparatus.
- The method will be totally automatic. Once the measuring system has been installed, liner slip detection will be performed without any further involvement from the milking staff.
- The invention allows for automatic data input to a central database of the machine milking system.
- The detecting does not affect the farmer's routines or daily work.
- The sensor will be cleaned together with the rest of the system.
- The apparatus is easy to use. No calibration of the apparatus is needed when it once has been installed, unless the user wants to perform very accurate measurements of small liner slips.
- The installation of the detecting apparatus includes connection of a T-piece at the end of the long milk tube(s), connection of cables to a controller board and from the controller board to a communications system, and attaching said board to a wall or the like, tasks easily performed by a technician without special training.
- The apparatus offers a very flexible operation as it actually allows the user to define a liner slip by the setting of the various criteria.
- The apparatus may be manufactured to a very low cost.
- In the last depicted embodiment, by localizing a pressure sensor at the end of each long milk tube, it is even possible to identify at which teat cup the liner slip occurs.

It will be obvious that the invention may be varied in a plurality of ways. Such variations are not to be regarded as a departure from the scope of the invention. All such modifications as would be obvious to one skilled in the art are intended to be included within the scope of the appended claims.

What is claimed is:

1. A method for detecting liner slips in a milking machine system having at least one milking unit, each of said at least one milking unit including a clawpiece and a cluster of teat cups connected to the clawpiece, wherein each teat cup has a shell body and an internal flexible liner, said liner comprising a mouthpiece and a body part, whereby the liner extends through the bottom of the shell body as a short milk tube and is connected to the clawpiece and further, by way of a long milk tube, to a source of steady vacuum, an annular space located between the teat cup shell body and the teat cup liner being connected to the clawpiece by a pulse tube and further to a source of pulsating vacuum, said method including the steps of:

sensing the pressure of the milk-air mixture in the system downstream of said long milk tube, and detecting a liner slip in dependence of a predetermined change in said sensed pressure.

2. The method as claimed in claim 1, including detecting a liner slip if said predetermined pressure change fulfills a rapidity criterion.

3. The method as claimed in claim 2, including choosing the rapidity criterion as predetermined pressure rise during a short period of time.

4. The method as claimed in claim 1, including detecting a liner slip if said predetermined pressure change fulfills a magnitude criterion.

5. The method as claimed in claim 4, including choosing the magnitude criterion as a predetermined pressure rise.

6. The method as claimed in claim 5, wherein the magnitude criterion comprises that said predetermined pressure rise occurs during a predetermined period of time.

7. The method as claimed in claim 1, including blocking the detecting during a predetermined blocking time subsequent to a detected liner slip.

8. The method as claimed in claim 1, including blocking the detecting when the sensed pressure is above a predetermined level.

9. The method as claimed in claim 1, including blocking the detecting during a predetermined period of time for cluster attachment.

10. The method as claimed in claim 1, including accumulating the number of detected liner slips during a predetermined period of time.

11. The method as claimed in claim 1 wherein the sensing step includes continuously sensing the pressure in the system downstream of said long milk tube.

12. The method as claimed in claim 1 wherein the sensing step includes discontinuously sensing the pressure in the system downstream of said long milk tube.

13. An apparatus for detecting liner slips in a milking machine having at least one milking unit, each at least one milking unit having a clawpiece and a cluster of teat cups connected to the clawpiece, wherein each teat cup has a shell body and an internal flexible liner, said liner comprising a mouthpiece and a body part, whereby the liner extends through the bottom of the shell body as a short milk tube and is connected to the clawpiece and further, by way of a long milk tube, to a source of steady vacuum, an annular space located between the teat cup shell body and the teat cup liner being connected to the clawpiece by a pulse tube and further to a source of pulsating vacuum, said apparatus comprising:

a pressure sensor located downstream of said long milk tube for continuously or discontinuously sensing the pressure of the milk-air mixture in the system downstream of said long milk tube, and a detecting means connected to said sensor arranged for detecting a liner slip in dependence of a predetermined change in said sensed pressure.

14. The apparatus as claimed in claim 13, wherein the detecting means is arranged for detecting a liner slip if said predetermined pressure change fulfills a rapidity criterion.

15. The apparatus as claimed in claim 14, wherein the rapidity criterion is a predetermined pressure rise during a short period of time.

16. The apparatus as claimed in claim 13, wherein the detecting means is arranged for detecting a liner slip if said predetermined pressure change fulfills a magnitude criterion.

17. The apparatus as claimed in claim 16, wherein the magnitude criterion is a predetermined pressure rise.

18. The apparatus as claimed in claim 13, wherein the apparatus is arranged for blocking the detecting during a predetermined blocking time subsequent to a detected liner slip.

19. The apparatus a claimed in claim 13, wherein the apparatus is arranged for blocking the detecting when the sensed pressure is above a predetermined level.

20. The apparatus as claimed in claim 13, wherein the apparatus is arranged for accumulating the number of detected liner slips during a predetermined period of time.

21. The apparatus as claimed in claim 13, including a T-piece having a first end connected to the downstream end of the long milk tube, a second end connected to the steady vacuum, and a third end, whereby the sensor is attached at the third end of the T-piece by virtue of an attaching means.

22. The apparatus as claimed in claim 13, wherein the apparatus further comprises means for adjusting the predetermined pressure change.

23. A method for detecting liner slips in a milking machine system having at least one milking unit, each of said at least one milking unit including a plurality of teat cups, each of said teat cups having a shell body and an internal flexible liner, said internal flexible liner comprising a mouthpiece and a body part, wherein each liner extends through the bottom of the respective shell body and is connected, by way of a respective long milk tube, to a source of steady vacuum, and a respective annular space, located between the shell body and the liner being connected to a source of pulsating vacuum, said method comprising the steps of:
   sensing the pressure in the system downstream of each of said long milk tubes,
   detecting a liner slip in dependence of a predetermined change in one of each sensed pressure, and further
   identifying a slipping liner by way of identifying said one of each sensed pressures.

24. The method as claimed in claim 23, including detecting a liner slip if said predetermined pressure change fulfills a rapidity criterion.

25. The method as claimed in claim 23, including blocking the detecting during a predetermined blocking time subsequent to a detected liner slip.

26. The method as claimed in claim 23 wherein the sensing step includes continuously sensing the pressure in the system downstream of said long milk tube.

27. The method as claimed in claim 23 wherein the sensing step includes discontinuously sensing the pressure in the system downstream of said long milk tube.

28. The method as claimed in claim 23 including detecting a liner slip if said predetermined pressure change fulfills a magnitude criterion.

29. An apparatus for detecting liner slips in a milking machine system having at least one milking unit, each at least one milking unit having a plurality of teat cups, each teat cup having a shell body and an internal flexible liner, said internal flexible liner comprising a mouthpiece and a body part, wherein each liner extends through the bottom of the respective shell body and is connected, by way of a respective long milk tube, to a source of steady vacuum, while the respective annular space, between the teat cup shell body and the liner, is connected to a source of pulsating vacuum, said apparatus comprising:
   a plurality of pressure sensors located downstream of each of said long milk tubes for continuously or discontinuously sensing the pressure in the system downstream of each of said long milk tubes, and
   a detecting means connected to said sensor arranged for detecting a liner slip in dependence of a predetermined change in one of each said sensed pressure and for identifying a slipping liner by way of identifying said one of each sensed pressures.

30. The apparatus as claimed in claim 29 wherein the detecting means is arranged for detecting a liner slip if said predetermined pressure change fulfills a rapidity criterion.

31. The apparatus as claimed in claim 29, wherein the apparatus is arranged for blocking the detecting during a predetermined blocking time subsequent to a detected liner slip.

32. The apparatus as claimed in claim 29 wherein the detecting means is arranged for detecting a liner slip if said predetermined pressure change fulfills a magnitude criterion.

33. A method for detecting liner slips in a milking machine system having at least one milking unit, each of said at least one milking unit including a clawpiece and a cluster of teat cups connected to the clawpiece, wherein each teat cup has a shell body and an internal flexible liner, said liner comprising a mouthpiece and a body part, whereby the liner extends through the bottom of the shell body as a short milk tube and is connected to the clawpiece and further, by way of a long milk tube, to a source of steady vacuum, an annular space located between the teat cup shell body and the teat cup liner being connected to the clawpiece by a pulse tube and further to a source of pulsating vacuum, said method including the steps of:
   sensing the pressure in the system at the downstream end of said long milk tube, and
   detecting a liner slip in dependence of a predetermined change in said sensed pressure.

34. An apparatus for detecting liner slips in a milking machine having at least one milking unit, each at least one milking unit having a clawpiece and a cluster of teat cups connected to the clawpiece, wherein each teat cup has a shell body and an internal flexible liner, said liner comprising a mouthpiece and a body part, whereby the liner extends through the Bottom of the shell body as a short milk tube and is connected to the clawpiece and further, by way of a long milk tube, to a source of steady vacuum, an annular space located between the teat cup shell body and the teat cup liner being connected to the clawpiece by a pulse tube and further to a source of pulsating vacuum, said apparatus comprising:
   a pressure sensor located at the downstream end of said long milk tube for continuously or discontinuously sensing the pressure in the system at the downstream end of said long milk tube, and
   a detecting means connected to said sensor arranged for detecting a liner slip in dependence of a predetermined change in said sensed pressure.

\* \* \* \* \*